(12) United States Patent
Yhann (10) Patent No.: US 7,868,887 B1
(45) Date of Patent: Jan. 11, 2011

(54) RENDERING RATIONAL QUADRATIC BÉZIER CURVES ON A GPU

(75) Inventor: Stephan R. Yhann, Renton, WA (US)

(73) Assignee: Adobe Systems Incorporated, San Jose, CA (US)

(*) Notice: Subject to any disclaimer, the term of this patent is extended or adjusted under 35 U.S.C. 154(b) by 709 days.

(21) Appl. No.: 11/874,600

(22) Filed: Oct. 18, 2007

(51) Int. Cl.
*G06T 11/20* (2006.01)
(52) U.S. Cl. ..................................... 345/442
(58) Field of Classification Search .............. 345/442
See application file for complete search history.

(56) References Cited

U.S. PATENT DOCUMENTS

| | | | |
|---|---|---|---|
| 6,295,072 | B1 | 9/2001 | Pon et al. |
| 6,954,211 | B2 | 10/2005 | Michail et al. |
| 7,050,067 | B2 | 5/2006 | Raubacher et al. |
| 7,116,327 | B2 | 10/2006 | Katka |
| 7,127,525 | B2 | 10/2006 | Coleman et al. |
| 7,239,319 | B2 | 7/2007 | Loop |
| 2004/0075655 | A1* | 4/2004 | Dunnett ............... 345/418 |
| 2004/0085312 | A1* | 5/2004 | Buchner et al. ........ 345/423 |
| 2007/0097121 | A1* | 5/2007 | Loop et al. ........... 345/428 |
| 2007/0097123 | A1 | 5/2007 | Loop et al. |

FOREIGN PATENT DOCUMENTS

EP 1630745 1/2006

OTHER PUBLICATIONS

Raimund Seidel, "A Simple and Fast Incremental Randomized Algorithm for Computing Trapezoidal Decompositions and for Triangulating Polygons," Computational Geometry: Theory and Applications, Jul. 1991, pp. 51-64, vol. 1, No. 1, Elsevier Science Publishers B.V., Amsterdam.
U.S. Appl. No. 11/848,950, filed Aug. 31, 2007.
U.S. Appl. No. 11/848,948, filed Aug. 31, 2007.
U.S. Appl. No. 11/848,943, filed Aug. 31, 2007.
U.S. Appl. No. 11/848,940, filed Aug. 31, 2007.
Bala R. Vatti, "A Generic Solution to Polygon Clipping," Communications of the ACM, Jul. 1992, pp. 56-63, vol. 35, Issue 7, ACM Press, New York, NY.
Eric Chan, "Fast Antialiasing Using Prefiltered Lines on Graphics Hardware," Feb. 2004, http://people.csail.mit.edu/ericchan/articles/prefilter/.

(Continued)

*Primary Examiner*—Ryan R Yang
(74) *Attorney, Agent, or Firm*—Robert C. Kowert; Meyertons, Hood, Kivlin, Kowert & Goetzel, P.C.

(57) ABSTRACT

A method, system, and computer-readable storage medium are disclosed for rendering Bézier curves using a graphics processing unit (GPU). In one embodiment, a respective set of barycentric coordinates may be assigned to each of the three vertices of a triangle. The triangle may comprise a control triangle for a quadratic Bézier curve, and the quadratic Bézier curve may be a rational quadratic Bézier curve. Each set of barycentric coordinates may comprise three values such as (1,0,0), (0,1,0) or (0,0,1). In one embodiment, the quadratic Bézier curve may be rendered using the GPU. Rendering the quadratic Bézier curve may comprise evaluating a function of the barycentric coordinates using the GPU.

24 Claims, 8 Drawing Sheets

OTHER PUBLICATIONS

Charles Loop and Jim Blinn, "Resolution Independent Curve Rendering Using Programmable Graphics Hardware," ACM SIGGRAPH 2005, 2005, pp. 1000-1009, ACM Press, New York, NY.

John D. Hobby, "Rasterization of Nonparametric Curves," ACM Transactions on Graphics, Jul. 1990, pp. 262-277, vol. 9, Issue 3, ACM Press, New York, NY.

Fiaz Hussain and Michael L.V. Pitteway, "Rasterizing the Outlines of Fonts," Electronic Publishing, Sep. 1993, pp. 171-181, vol. 6, No. 3.

Zheng Qin, Michael D. McCool, and Craig S. Kaplan, "Real-Time Texture-Mapped Vector Glyphs," Symposium on Interactive 3D Graphics, 2006, pp. 125-132, ACM Press, New York, NY.

Seth J. Teller and Carlo H. Sequin, "Modeling Implicit Quadrics and Free-form Surfaces With Trimmed Rational Quadratic Bezier Patches," Technical Report No. UCB/CSD-90-577, Jun. 1990, University of California-Berkeley.

* cited by examiner

RENDERING RATIONAL QUADRATIC BÉZIER CURVES ON A GPU

BACKGROUND

1. Field of the Invention

The present invention is directed to computer systems; and more particularly, it is directed to the rendering of curves using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

Graphical data may often be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data. The Adobe® PostScript® language, Adobe® Portable Document Format, and Adobe® Imaging Model, for example, include various structures and commands to describe complex two-dimensional graphical data including geometric models and bitmapped images.

One geometric object typically used in imaging models is the Bézier curve. A quadratic Bézier curve is a parametric curve defined by three control points ($P_0$, $P_1$, $P_2$) in a plane or in three-dimensional space. Starting at $P_0$ and ending at $P_2$, the curve is influenced by the position of an additional control point $P_1$. A rational quadratic Bézier curve is a quadratic Bézier curve defined by a rational fraction of quadratic polynomials. A conic is a quadratic Bézier curve that is an ellipse, parabola, or hyperbola. A normal quadratic Bézier curve is a special case of the conics. A cubic Bézier curve is a parametric curve defined by four control points. A cubic Bézier curve may typically be represented by two or more quadratic Bézier curves, although in some cases a cubic Bézier curve may be represented using only one quadratic Bézier curve (such as the degenerate case where the cubic is itself a line or a quadratic). A typical approach to rendering curves on a GPU is to "flatten" the curve by breaking it into a series of line segments that approximate the shape of the original curve.

One approach for rendering quadratic Bézier curves is described in "Resolution Independent Curve Rendering Using Programmable Graphics Hardware" (Charles Loop and Jim Blinn, ACM SIGGRAPH 2005, pages 1000-1009). In the Loop and Blinn approach, a quadratic Bézier curve is mapped to a canonical Bézier curve represented by the implicit equation $y-x^2=0$ in the canonical coordinate space. The mapping is a linear transformation. The coordinates from the canonical curve are attached as texture parameters to the vertices of the quadratic Bézier curve in design coordinate space and are sent to the GPU. The GPU hardware interpolates the canonical curve parameters and passes them to a pixel shader. The pixel shader uses the canonical curve parameters in the implicit equation to determine if a point is above or below the curve and to clip or paint the point accordingly. However, in extending the Loop and Blinn approach to rational quadratic curves, additional computation is required to find another canonical representation because the mapping is no longer a direct assignment of known canonical values.

SUMMARY

Various embodiments of systems, methods, and computer-readable storage media for rendering quadratic Bézier curves using a graphics processing unit (GPU) are disclosed. In one embodiment, a respective set of barycentric coordinates may be assigned to each of the three vertices of a triangle. The triangle may comprise a control triangle for a quadratic Bézier curve such as a rational quadratic Bézier curve. In one embodiment, each set of barycentric coordinates is a triple of numbers defining a coordinate system with respect to the coordinates of a triangle. Therefore, each set of barycentric coordinates may comprise three values such as (1,0,0), (0,1,0), or (0,0,1). For example, the set of coordinates (0,1,0) may be assigned to the vertex corresponding to the non-endpoint control point of the curve. The barycentric coordinates may be sent to the GPU as one or more texture parameters associated with the vertices of the triangle.

In one embodiment, the quadratic Bézier curve may be rendered using the GPU. Rendering the quadratic Bézier curve may comprise evaluating a function of the barycentric coordinates and clipping or painting points within the triangle accordingly. To evaluate points within the triangle and points on the edges of the triangle, barycentric coordinates for those points may be determined through interpolation. In this manner, both normal Bézier quadratic curves and rational Bézier quadratic curves may be rendered efficiently on the GPU.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
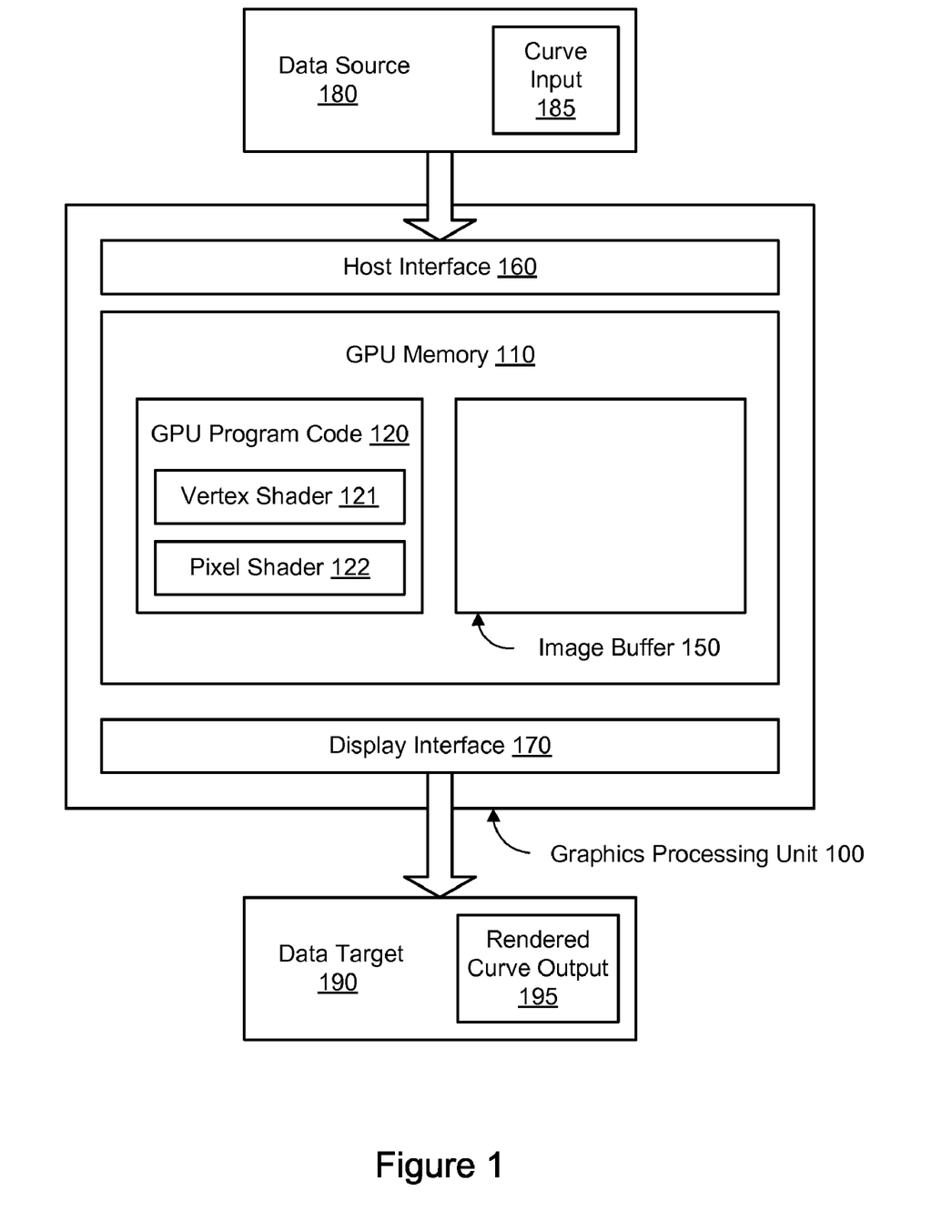
FIG. 1 is a block diagram illustrating one embodiment of a graphics processing unit (GPU) configured for rendering Bézier curves.

Using embodiments of the systems and methods described herein, Bézier curves may be rendered efficiently using a graphics processing unit (GPU). As will be discussed with reference to FIG. 9, rational quadratic Bézier curves may be rendered using a GPU by representing each curve in barycentric coordinates. FIG. 1 is a block diagram illustrating one embodiment of a GPU 100 configured for rendering Bézier curves. The GPU 100, also referred to herein as a graphics processor, may comprise a dedicated graphics rendering device associated with a computer system. An example of a suitable computer system 900 for use with a GPU is illustrated in FIG. 10. Turning back to FIG. 1, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 1. It is contemplated that GPU architectures other than the example architecture of FIG. 1 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900, or the host system itself). For example, the data source 180 may provide input data (e.g., a scene comprising one or more geometric objects including one or more Bézier curves) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise a display device 952, and the GPU 100 (along with other graphics components and/or interfaces 956) may "drive" the display 952 by providing graphics data at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, program instructions 940 may be stored in the memory 920 of the host computer system 900 and executed by the host computer system 900 to generate rendered Bézier curve output 195 based on Bézier curve input 185. The curve input 185 may include a scene comprising one or more geometric objects (e.g., as vertices and associated data in a tessellation). As will be described in greater detail below, each cubic Bézier curve intended to be rendered may be subdivided into a respective set of quadratic Bézier curves prior to sending the curve input 185 to the GPU 100. The curve input 185 may therefore comprise a plurality of quadratic Bézier curves. A quadratic Bézier curve is a parametric curve defined by three points ($P_0$, $P_1$, $P_2$) in a plane or in three-dimensional space. The quadratic Bézier curve starts at $P_0$ and ends at $P_2$; the quadratic Bézier curve is influenced by the position of the control points $P_1$ relative to the endpoints $P_0$ and $P_2$. In one embodiment, the curve input 185 may comprise one or more rational quadratic Bézier curves. A rational quadratic Bézier curve is a quadratic Bézier curve defined by a rational fraction of quadratic polynomials.

In one embodiment, the GPU 100 may include GPU program code 120 that is executable by the GPU 100 to perform aspects of the techniques discussed herein. For example, the geometric objects in the curve input 185 may be rasterized to pixels during a rendering process including execution of the GPU program code 120 on the GPU 100. Elements of the GPU program code 120 may be provided to the GPU 100 by a host computer system (e.g., the data source 180) and/or native to the GPU 100. In one embodiment, the GPU program code 120 may comprise a vertex shader 121. A vertex shader 121 comprises program instructions that are executable by the GPU 100 to determine properties (e.g., position) of a particular vertex. A vertex shader may expect input such as uniform variables (e.g., constant values for each invocation of the vertex shader) and vertex attributes (e.g., per-vertex data). In one embodiment, the GPU program code 120 may comprise a pixel shader 122. A pixel shader 122 comprises program instructions that are executable by the GPU 100 to determine properties (e.g., color) of a particular pixel. A pixel shader may also be referred to as a fragment shader. A pixel shader may expect input such as uniform variables (e.g., constant values for each invocation of the pixel shader) and pixel attributes (e.g., per-pixel data). In generating the rendered curve output 195, both the vertex shader 121 and the pixel shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 1, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 150 may comprise a multi-sampling buffer usable for automatic anti-aliasing.

As discussed above, each cubic Bézier curve intended to be rendered may be subdivided into a respective set of quadratic Bézier curves prior to sending the curve input 185 to the GPU 100. Although this approach may result in sending more triangles to the GPU 100, fewer per-vertex attributes may be sent for each triangle. In one embodiment, one attribute per vertex may be sent to the GPU for each quadratic Bézier curve instead of three attributes per vertex for each cubic Bézier curve. Thus, usage of GPU memory 110 is reduced for each triangle associated with a curve. Because all vertices of triangles in a path generally use the same vertex data structure, usage of GPU memory 110 may also be reduced for other triangles (e.g., interior triangles and other non-curve triangles). Additionally, the computation on the GPU 100 (e.g., in computing curve parameters for rendering) as well as the CPU may be less expensive for the quadratic Bézier curves than for the corresponding cubic Bézier curve. For example, the computations to determine the rendering parameters may be simpler on the CPU, and fewer instructions may be used in the pixel shader on the GPU. Furthermore, the computation in the GPU and/or CPU may be more robust through avoidance of singularities near regions around cusps and sharp discontinuities of cubic Bézier curves.

Figure 2:
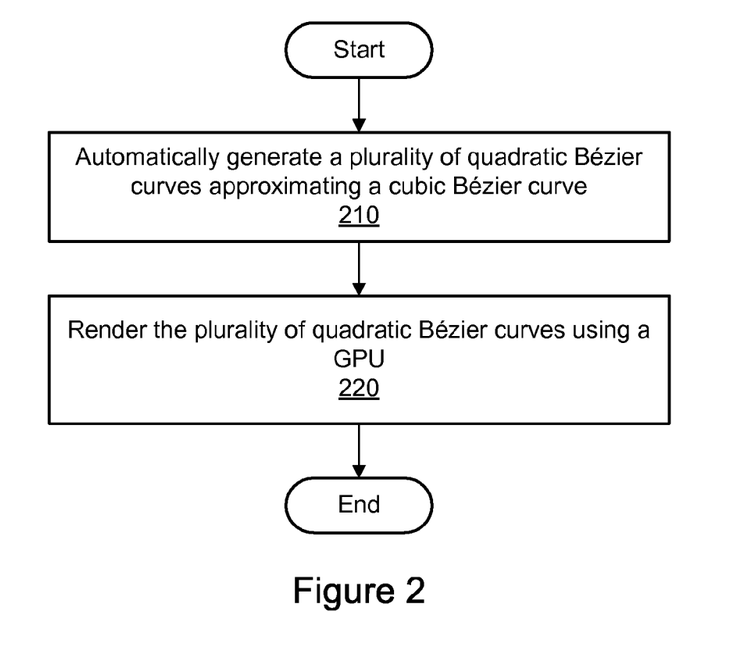
FIG. 2 is a flow diagram illustrating a method for rendering cubic Bézier curves using a GPU according to one embodiment.

FIG. 2 is a flow diagram illustrating a method for rendering cubic Bézier curves using a GPU according to one embodiment. As shown in block 210, a plurality of quadratic Bézier curves may be automatically generated. The plurality of quadratic Bézier curves may approximate or otherwise represent a cubic Bézier curve. Subdivision of the cubic Bézier curve into the plurality of quadratic Bézier curves may be performed using any suitable algorithm. Generally, the number of quadratic Bézier curves used to fit a cubic Bézier curve may depend on a fitness tolerance value and the shape of the cubic Bézier curve. In some algorithms, a fixed number of quadratic Bézier curves may be generated. In other embodiments, the number of quadratic Bézier curves may be estimated based on factors such as the position of the control points of the cubic Bézier curve, the error tolerance, etc. In one embodiment, two quadratic Bézier curves may be generated for each cubic Bézier curve. In another embodiment, four quadratic Bézier curves may be generated for each cubic Bézier curves. In other embodiments, other suitable numbers of quadratic Bézier curves (e.g., from one to many) may be generated. The plurality of quadratic Bézier curves may be sent to the GPU as a sequential list. An example of the subdivision of a cubic Bézier curve is discussed below with respect to FIG. 3.

The plurality of quadratic Bézier curves may be sent to the GPU 100 as a sequential list. Turning back to FIG. 2, as shown in block 220, the plurality of quadratic Bézier curves may then be rendered using the GPU 100. The rendering of the quadratic Bézier curves is further described below with reference to FIG. 4.

Figure 3:
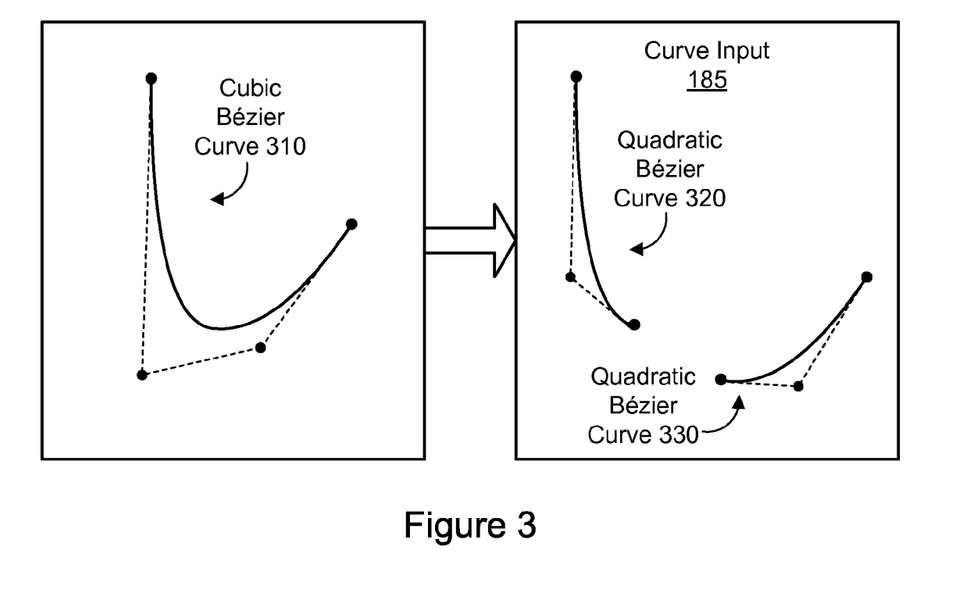
FIG. 3 is a block diagram illustrating the subdivision of a cubic Bézier curve according to one embodiment.

FIG. 3 is a block diagram illustrating the subdivision of a cubic Bézier curve according to one embodiment. From a cubic Bézier curve 310 (shown with two endpoints and two additional control points), one or more quadratic Bézier curves may be generated that approximate the original curve. In the example shown in FIG. 3, two quadratic Bézier curves 320 and 330 are generated. Subdivision of the cubic Bézier curve may be performed using any suitable algorithm. For example, the original cubic Bézier curve 310 may be divided by first determining its midpoint. The midpoint of the cubic Bézier curve may then determine two adjoining endpoints of the two new quadratic Bézier curves 320 and 330. For purposes of illustration, a gap is shown between the two quadratic Bézier curves 320 and 330; however, in the internal representation and in the rendered form of the quadratic Bézier curves 320 and 330, the two curves 320 and 330 may adjoin at the shared endpoint such that the two new curves approximate the original cubic Bézier curve. The additional control point for each of the two quadratic Bézier curves 320 and 330 may also be suitably determined. In one embodiment, the cubic Bézier curve 310 may be recursively subdivided until a desired condition is met or until a desired number of resulting quadratic Bézier curves are generated. For example, the quadratic Bézier curves 320 and 330 may be further subdivided so that four resulting quadratic Bézier curves approximate the original cubic Bézier curve. Locations on the quadratic Bézier curves resulting from the subdivision may have the same color and alpha values as the corresponding locations on the original cubic Bézier curve.

Figure 4:
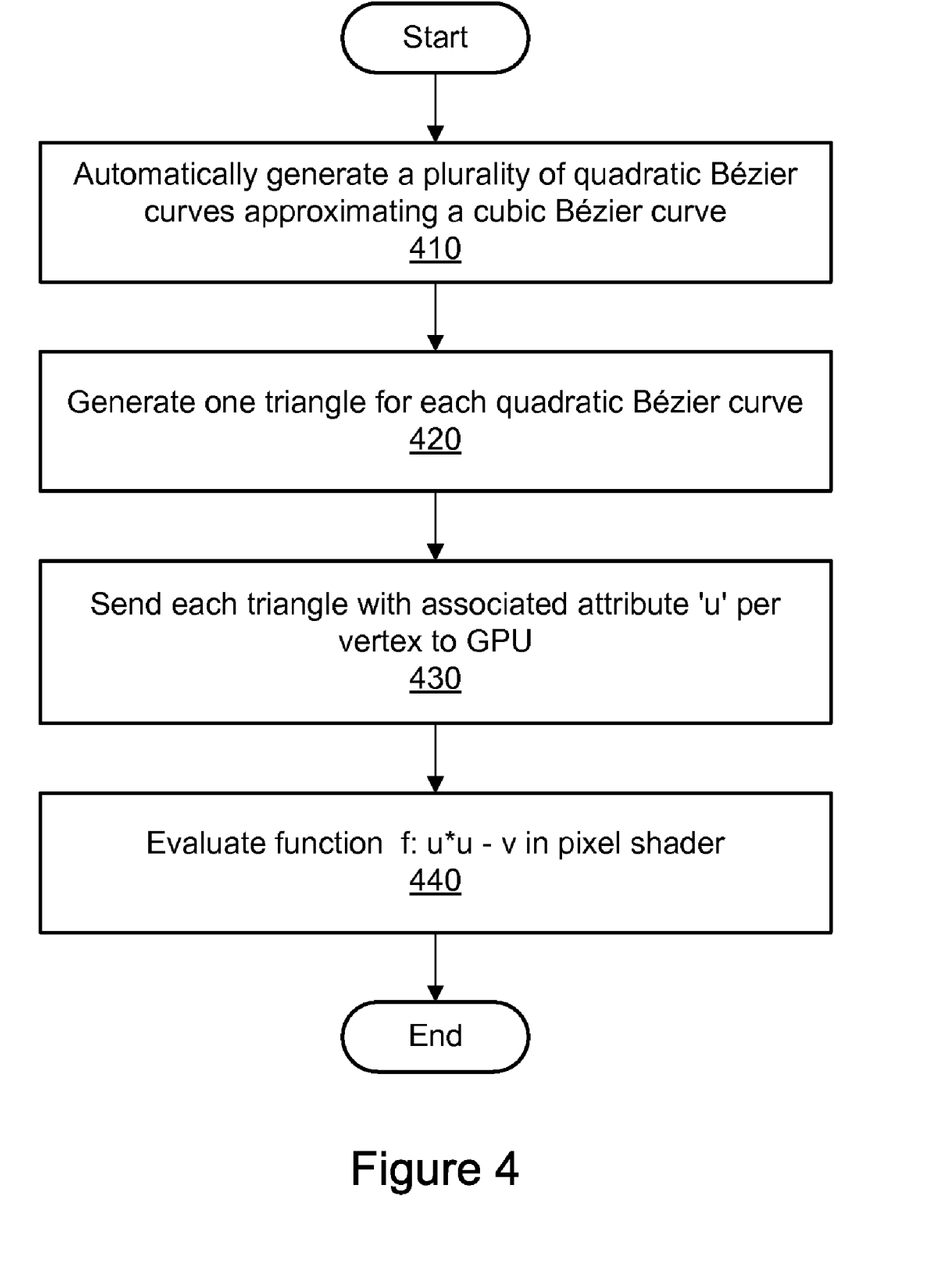
FIG. 4 is a flow diagram illustrating further aspects of a method for rendering cubic Bézier curves using a GPU according to one embodiment.

FIG. 4 is a flow diagram illustrating further aspects of a method for rendering cubic Bézier curves using a GPU 100 according to one embodiment. As shown in block 410, a plurality of quadratic Bézier curves may be automatically generated as discussed above with respect to FIGS. 2 and 3. The plurality of quadratic Bézier curves may approximate or otherwise represent a cubic Bézier curve.

As shown in block 420, one triangle may be generated for each quadratic Bézier curve. As shown in FIG. 3, for example, each of the quadratic Bézier curves 320 and 330 may fit within a triangle determined by the curve's three control points (i.e., the two endpoints and the additional control point). Because the triangles representing the quadratic Bézier curves 320 and 330 fit the curve more closely than triangles representing the original cubic Bézier curve 310, fewer pixels are typically passed to the pixel shader and clipped in the pixel shader.

Turning back to FIG. 4, as shown in block 430, each triangle may be sent to the GPU with one attribute per vertex representing a parameter for a canonical form of the corresponding quadratic Bézier curve. In one embodiment, each quadratic Bézier curve is transformed into a canonical quadratic Bézier curve by mapping the curve into canonical space. A canonical quadratic Bézier curve is described by three control points A, B, and C, where the two-dimensional (u, v) coordinates of the three control points are given by A: (0, 0), B: (0.5, 0), and C: (1, 1). For the function $f$: $u*u-v$, $f=0$ indicates points that lie on the curve. Because the parameter v can be evaluated given the parameter u, it may be sufficient to pass the parameter u to the GPU 100 but not the parameter v for each vertex in the triangle representing the quadratic Bézier curve. The value of the vertex attributes may be interpolated for every pixel (based on the three vertices) and sent to the pixel shader. In one embodiment, the interpolation may be performed during a rasterization stage between the vertex shader and the pixel shader. As shown in block 440, the function $f$: $u*u-v$ (i.e., $f(u,v)=u^2-v$) may be evaluated in the pixel shader to draw the curve. In one embodiment, pixels for which $f<0$ are considered to be inside the curve, and other pixels are considered to be outside the curve. In one embodiment, an additional per-vertex attribute (e.g., a positive or negative sign) indicating a side of the curve to paint may be sent to the GPU.

In contrast to the approach described in FIG. 4, rendering a cubic Bézier curve directly in the GPU (i.e., without conversion of the cubic Bézier curve to a plurality of quadratic Bézier curves) typically requires greater use of the computational and memory resources of the GPU 100. A cubic Bézier curve is determined by four control points (u, v, w) given by A: $(u_1, v_1, w_1)$, B: $(u_2, v_2, w_2)$, C: $(u_3, v_3, w_3)$, and D $(u_4, v_4, w_4)$. Computation of the parameters for the four control points of the cubic Bézier curve may involve expensive matrix and/or vector operations. Additionally, evaluation of the function $f$: $sign*(u*u*u-v*w)$, where the sign denotes the side of the curve to be painted, is performed rather than evaluation of the simpler function $f$: $u*u-v$ discussed above. The use of simpler quadratic Bézier curves may also avoid ambiguous inside-outside classifications for loops and self-intersections found in some cubic Bézier curves.

In one embodiment, rendering efficiency may be achieved through efficient packaging of per-vertex data associated with Bézier curves sent to the GPU 100. In a prior approach, three texture coordinates as per-vertex attributes (i.e., u, v, and a sign indicating which side of the curve to draw) are sent to the GPU for each vertex of each triangle; the function $f$: $sign*(u*u-v)$ is then evaluated by the GPU such that only pixels for which $f>=0$ are rendered. By reducing the amount of texture coordinates sent to the GPU 100 for each triangle, the efficiency of the use of GPU resources may be improved. For example, GPU memory usage may be reduced, and bandwidth for data transfer between the host system and the GPU 100 may also be reduced.

Figure 5:
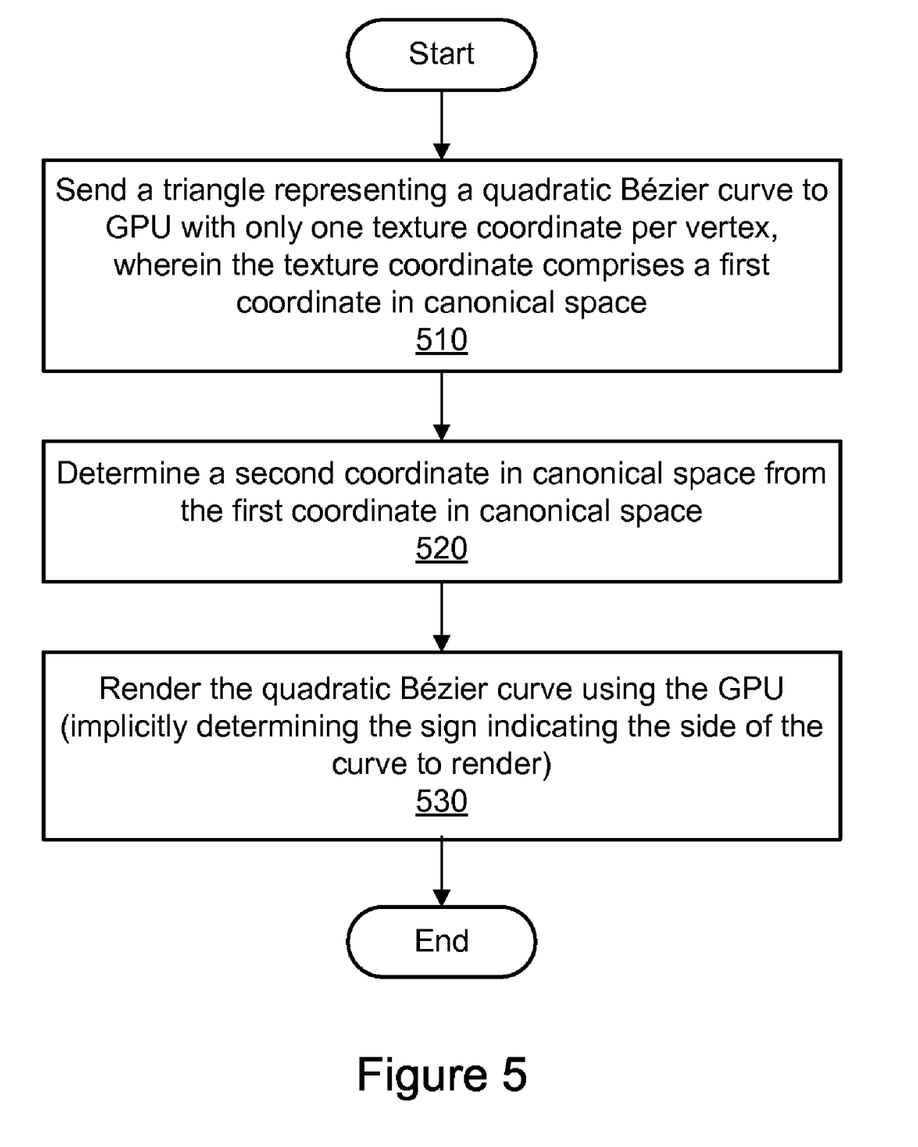
FIG. 5 is a flow diagram illustrating a method for efficient packaging of data associated with Bézier curves according to one embodiment.

FIG. 5 is a flow diagram illustrating a method for efficient packaging of data associated with Bézier curves according to one embodiment. Each quadratic Bézier curve may be transformed into a canonical quadratic Bézier curve by mapping the curve into canonical space. A canonical quadratic Bézier curve is described by three control points A, B, and C, where the two-dimensional (u, v) coordinates of the three control points are given by A: (0, 0), B: (0.5, 0), and C: (1, 1). For the function $f$: $u*u-v$, $f=0$ indicates points that lie on the curve. As shown in block 510, each triangle may be sent to the GPU with one attribute (i.e., texture coordinate) per vertex representing a first coordinate in canonical space for a canonical form of the corresponding quadratic Bézier curve (i.e., as mapped to canonical space). For example, the coordinate u may be sent as the per-vertex attribute, while v and the sign are not sent to the GPU. The value of u may optionally be multiplied by the sign so that u indicates which side of the curve to draw.

As shown in block 520, the value of a second coordinate in canonical space (i.e., v) may be determined from the value of the first coordinate in canonical space (i.e., u) for each vertex sent to the GPU. Thus, v=0 when u==0, v=0 when u==0.5, and v=1 when u==1. The vertex shader may be called once for each vertex. The following vertex shader program code illustrates this technique in one embodiment, where each vertex has only one texture coordinate (e.g., u) as input:

void main vsQuadratic(in float3 pos: POSITION, in float tex: TEXCOORD0, out float4 oPos: POSITION, out float2 oTex: TEXCOORD0)
{
otex=float2(tex,0);
oPos=mul (float4(pos,1.0), mWorldViewProjection);
if(abs(tex)==1)
oTex.y=1;
}

The value of the per-vertex attributes may be interpolated for every pixel (based on the three vertices) and sent to the pixel shader. As shown in block 530, the curve may be rendered in the GPU 100. In one embodiment, the function $f$: $u*(u*u-v)$ (i.e., $f(u,v)=u^3-uv$) may be evaluated in the pixel shader to render the curve such that only pixels for which $f>=0$ are rendered while other pixels are clipped. In one embodiment, if the pixels on the left side of the curve are intended to be rendered instead of the pixels on the right side of the curve, then the sign of u can be reversed or "flipped" prior to sending the coordinate u to the GPU 100. Therefore, the value of the sign may be determined in block 530 even though the sign is not explicitly sent to the GPU 100 as a separate per-vertex attribute. The pixel shader may be called for each device pixel in a triangle. The following pixel shader program code illustrates this technique in one embodiment:

void main_psQuadratic(in float4 vPos:POSITION, in float2 vTex: TEXCOORD0, out float4 color: COLOR)
{
clip(vtex.x*(vTex.x*vTex.x-vTex.y));
color=float4(1,0,0,1);
}

Thus, a single texture coordinate sent to the GPU 100 for each vertex may represent both the position of the vertex in two-dimensional canonical space and the side of the curve to be painted. In one embodiment, two floating-point variables (e.g., representing v and the sign) may be eliminated from the per-vertex data sent to the GPU 100. Because the same vertex data structure is typically used for both curve-related triangles and other triangles in a scene or other batch sent to the GPU 100, the elimination of two variables per vertex in the data sent to the GPU 100 may result in resource savings throughout the entire scene or batch.

In other embodiments, the per-vertex data may be packaged efficiently by sending two per-vertex attributes rather than three to the GPU. In one embodiment, for example, each triangle may be sent to the GPU with two attributes per vertex (i.e., two texture coordinates per vertex) representing the first coordinate in canonical space and the second coordinate in canonical space but not the sign. In this case, the value of u may be multiplied by the sign so that u indicates which side of the curve to draw. In another embodiment, each triangle may be sent to the GPU with two attributes per vertex (i.e., two texture coordinates per vertex) representing the first coordinate in canonical space and the sign but not the second coordinate in canonical space.

Figure 6:
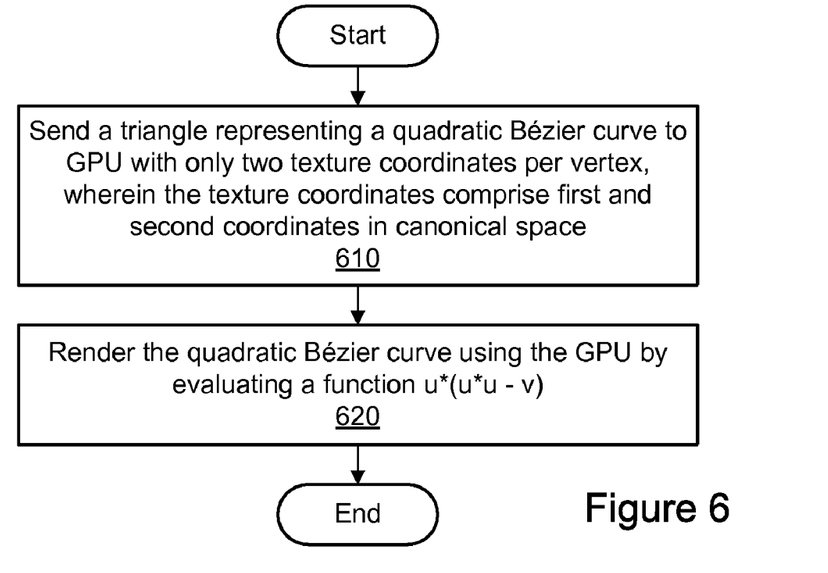
FIG. 6 is a flow diagram illustrating another method for efficient packaging of data associated with Bézier curves according to one embodiment.

FIG. 6 is a flow diagram illustrating another method for efficient packaging of data associated with Bézier curves according to one embodiment. As shown in block 610, a triangle representing a quadratic Bézier curve may be sent to the GPU. The triangle may comprise only two texture coordinates per vertex, and the two texture coordinates per vertex may comprise a first coordinate of the respective vertex in a canonical space and a second coordinate of the respective vertex in the canonical space. A sign of the first coordinate may optionally be reversed to flip the side of the quadratic Bézier curve to be rendered. As shown in block 620, the quadratic Bézier curve may be rendered using the GPU. In one embodiment, the curve may be rendered in the pixel shader by evaluating a function $u^3 - uv$ for each pixel, wherein the first coordinate in the canonical space is u and the second coordinate in the canonical space is v.

Figure 7:
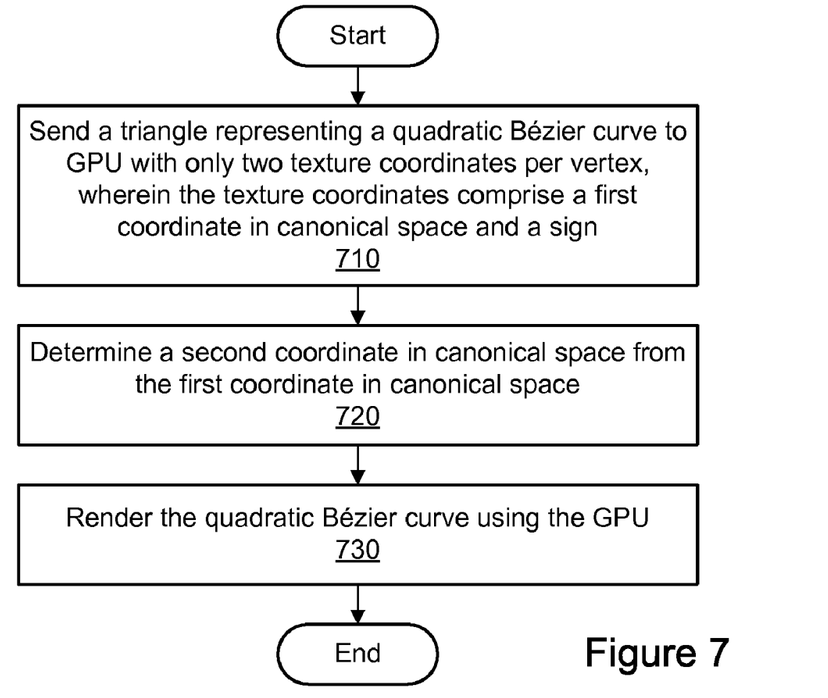
FIG. 7 is a flow diagram illustrating another method for efficient packaging of data associated with Bézier curves according to one embodiment.

FIG. 7 is a flow diagram illustrating another method for efficient packaging of data associated with Bézier curves according to one embodiment. As shown in block 710, a triangle representing a quadratic Bézier curve may be sent to the GPU. The triangle may comprise only two texture coordinates per vertex, and the two texture coordinates per vertex may comprise a first coordinate of the respective vertex in a canonical space and a sign indicating a side of the quadratic Bézier curve to render. As shown in block 720, a second coordinate in the canonical space for each vertex sent to the GPU may be determined based on the first coordinate in the canonical space for the respective vertex. As shown in block 730, the quadratic Bézier curve may be rendered using the GPU. In one embodiment, the curve may be rendered in the pixel shader by evaluating a function $u^3 - uv$ for each pixel, wherein the first coordinate in the canonical space is u and the second coordinate in the canonical space is v.

Various embodiments may be chosen to match the capabilities of a particular GPU 100 (e.g., the GPU 100 may lack a vertex shader). In one embodiment, the techniques for efficient packaging of per-vertex data may be applied to the direct rendering of cubic Bézier curves using a GPU. In one embodiment, only three attributes may be sent to GPU 100 for each vertex associated with a cubic curve: e.g., the coordinates (u, v, w) in canonical space. The sign may be omitted. To represent the side of the curve to be rendered, the sign of u and v or u and w may be flipped prior to sending the per-vertex texture coordinates to the GPU 100. In the pixel shader of the GPU 100, a cubic Bézier curve is typically rendered by evaluating the function $fu^3 - v*w$. By flipping the sign of u and v or u and w prior to sending the per-vertex texture coordinates to the GPU 100, a different side of the curve may be rendered by the pixel shader.

In one embodiment, the GPU 100 may be used to render rational quadratic Bézier curves. A rational quadratic Bézier curve is a quadratic Bézier curve defined by a rational fraction of quadratic polynomials. In one embodiment, a rational quadratic Bézier curve is defined in terms of barycentric coordinates prior to sending the curve to the GPU 100. Each set of barycentric coordinates is a triple of numbers defining a coordinate system with respect to the coordinates of a triangle. In one embodiment, the barycentric coordinates of the control triangle for the rational quadratic Bézier curve are unchanging and can be directly assigned. Thus, a simple equation (e.g., a function of the barycentric coordinates) may be evaluated in the pixel shader to determine if each pixel is above or below the curve. Both normal quadratic Bézier curves and rational quadratic Bézier curves may be represented in terms of barycentric coordinates in this manner. The techniques described herein for rendering rational quadratic Bézier curves on a GPU may be less complex and less computationally expensive than the Loop and Blinn approach.

The barycentric coordinates are the natural coordinate system for a triangle with the three vertices of the triangle having barycentric coordinates of (1,0,0), (0,1,0), and (0,0,1), respectively. Because the barycentric coordinates may be assigned directly to the vertices without additional computation to map the vertices and the coordinates. By defining the rational quadratic Bézier curve in barycentric coordinates, an equation may be produced for a family of curves that sweep out the area of the triangle. The barycentric coordinates for each point in the triangle may lie on exactly one curve which will either be above or below the curve enclosing the region to paint. The barycentric coordinates for a point inside the triangle may be computed in the GPU 100 (e.g., prior to executing the pixel shader) by interpolating between the values assigned to the triangle vertices. In the pixel shader, it may be determined whether the curve containing the point is below or above the curve defining the region to be painted, and thus whether the point is inside or outside of the region to be painted. Points that are not inside of the region to be painted may be clipped.

A rational quadratic Bézier curve, P(t), may be written in parametric form with parameter t as Equation 1:

$$P(t) = \frac{\sum_{k=0}^{2} w_k b_k B_k^2(t)}{\sum_{k=0}^{2} w_k B_k^2(t)} \quad (1)$$

where $B_k^2(t)$ are the second order Bernstein polynomials, $b_k$ are the three control points, and $w_k$ are weights on the Bernstein polynomials. The denominator in Equation 1 normalizes the equation. Equation 1 may also represent the family of conic sections: hyperbolae, parabolas, and ellipses. When $w_k = 1$, the denominator is 1, and the rational quadratic Bézier curve reduces to the normal quadratic Bézier form with control points $b_k$.

Figure 8A:
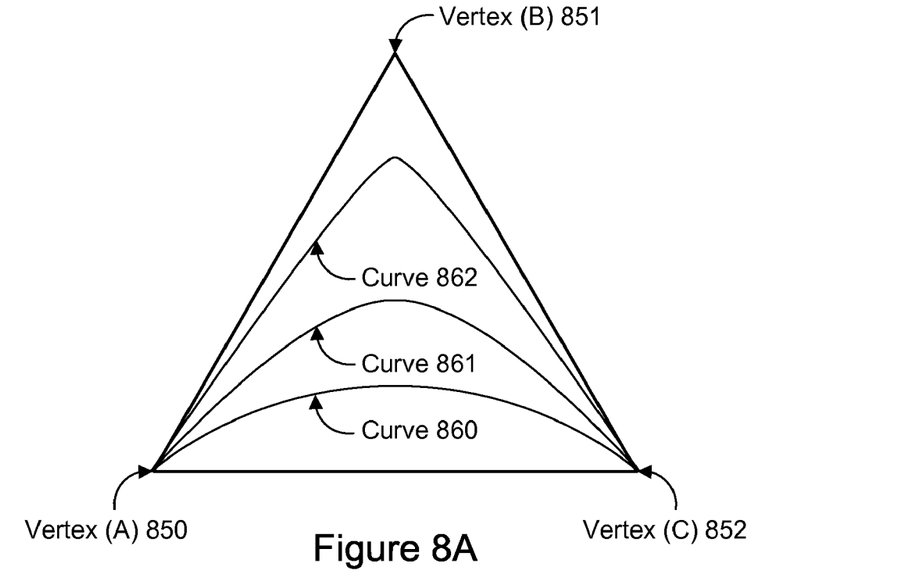
FIG. 8A illustrates examples of curves within a triangle having barycentric coordinates according to one embodiment.

When $w_0 = w_2 = 1$ and $w_1$ ranges from $(0, \infty)$, Equation 1 ranges from a straight line to an ellipse ($w_1 < 1$) to a parabola ($w_1 = 1$) to a hyperbola ($w_1 > 1$), with the straight line being a degenerate ellipse. FIG. 8A illustrates examples of a family of curves for varying values of $w_1$ according to one embodiment. A triangle ABC is defined by three vertices 850, 851, and 852. Within the triangle ABC, curve 860 may represent $w_1 < 1$, curve 861 may represent $w_1 = 1$, and curve 862 may represent $w_1 > 1$. As illustrated by FIG. 8A, curves with smaller values $w_1$ of are contained below curves with large values of $w_1$. By differentiating Equation 1 with respect to t to give the tangent vectors at A (vertex 850) and C (vertex 852) corresponding to t=0 and t=1 respectively, it may be seen that the sides AB and BC of the triangle are tangent to each curve at the points A and C:

$$P(0) = \frac{2w_1}{w_0}(b_1 - b_0) \text{ and } P(1) = \frac{2w_1}{w_2}(b_2 - b_1) \quad (2)$$

The w values affect the magnitude, but not the direction, of the tangent vectors. Therefore, with $w_0 = w_2 = 1$, smaller values of $w_1$ produce a smaller initial rate of increase along y in the curve such that these curves fall below curves with larger values of $w_1$.

Figure 8B:
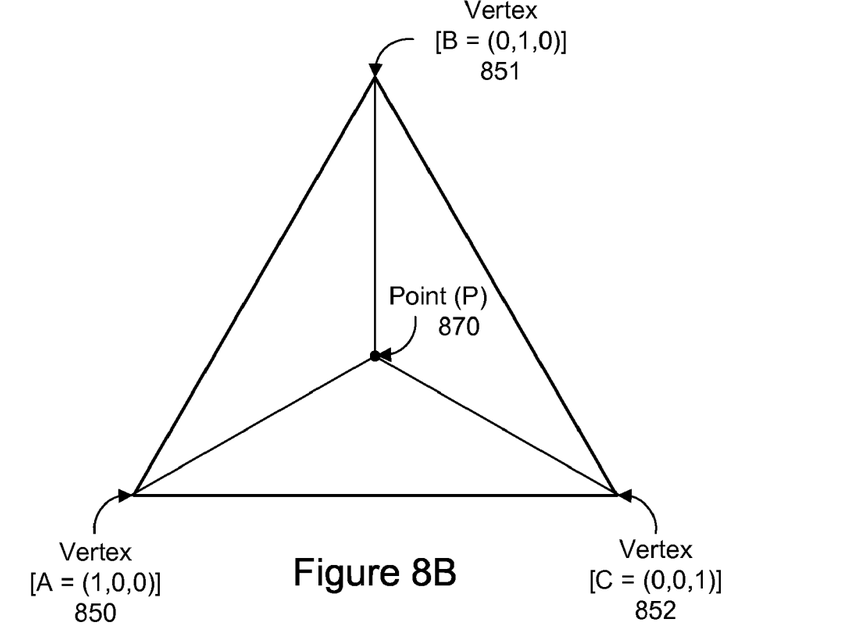
FIG. 8B illustrates an example of a point in a triangle having barycentric coordinates according to one embodiment.

FIG. 8B illustrates an example of a point in a triangle having barycentric coordinates according to one embodiment. As discussed above, the barycentric coordinates of a point are a triple of numbers defining a coordinate system with respect to the coordinates of triangle. More specifically, given the three vertices of a triangle ($b_0$, $b_1$, $b_2$), the barycentric coordinates ($\tau_0$, $\tau_1$, $\tau_2$) of a point P may be given by Equation 3:

$$P = \tau_0 b_0 + \tau_1 b_1 + \tau_2 b_2 = \sum_{k=0}^{2} \tau_k b_k \quad (3)$$

The barycentric coordinates for a point (P) 870 in the triangle ABC may be given by Equation 4:

$$P = (\tau_0, \tau_1, \tau_2) = \frac{(\text{Area}(PBC), \text{Area}(PAC), \text{Area}(PAB))}{\text{Area}(ABC)} \quad (4)$$

The barycentric coordinates may also be found by linearly interpolating the coordinates of the endpoints which are defined as shown in FIG. 8B.

By comparing Equation 1 and Equation 3, Equation 5 may be produced:

$$\tau_i = \frac{w_i B_i^2(t)}{\sum_{i=0}^{2} w_i B_i^2(t)} \quad (5)$$

There is a correspondence between the $\tau_k$ and the rational quadratic Bézier basis functions. By substituting the quadratic Bernstein polynomials and manipulating the forms of Equation 5 for k=0, 1, 2 to eliminate t, Equation 6 may be produced for points on the rational Bézier quadratic:

$$\frac{\tau_1^2}{\tau_0 \tau_2} = \frac{4 w_1^2}{w_0 w_2} \quad (6)$$

Setting $w_0 = w_1 = 1$ for the curves shown in FIG. 8A may produce Equation 7:

$$\frac{\tau_1^2}{\tau_0 \tau_2} = 4 w_1^2 \text{ or } \tau_1^2 = 4 w_1^2 \tau_0 \tau_2 \quad (7)$$

For a specific quadratic curve defined by its three control points and a $w_1$ value, Equation 7 defines the set of points that lie on the curve for the barycentric coordinates computed from the three control points. Every combination of barycentric coordinates for which the left hand side of the equation is greater than the right hand side defines a point that lies on a curve with $w_1'$; $> w_1$. Because every curve with a larger value of $w_1$ lies above the specified curve, these points lie above the curve. Similarly, points lie on curves below our curve when their barycentric coordinates make the left hand side of Equation 7 less than the right hand side. Thus, Equation 7 provides a simple way to determine which points in triangle lie above or below a rational quadratic Bézier curve or normal quadratic Bézier curve.

Because the barycentric coordinates of each vertex of a triangle are defined to be of the form (1,0,0), (0,1,0), (0,0,1), no computation may be needed to assign the barycentric coordinates for the triangle vertices. Because the barycentric coordinates are linear, the coordinates along each side of the triangle may be determined by interpolating between the corresponding vertices. The coordinates for a point 870 inside the triangle can be determined by interpolating between points on the sides of the triangle. The interpolation may take place in the GPU 100 (e.g., prior to executing the pixel shader).

Figure 9:
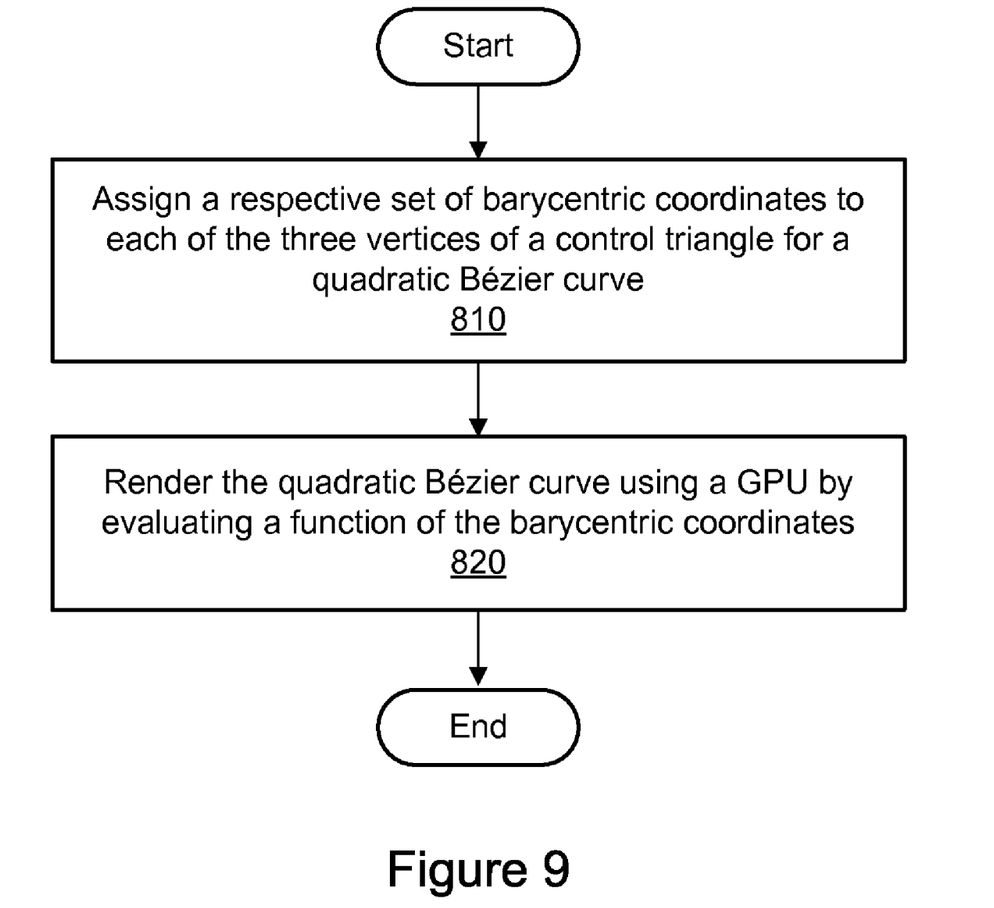
FIG. 9 is a flow diagram illustrating a method for rendering quadratic Bézier curves on a GPU using barycentric coordinates according to one embodiment.
Figure 10:
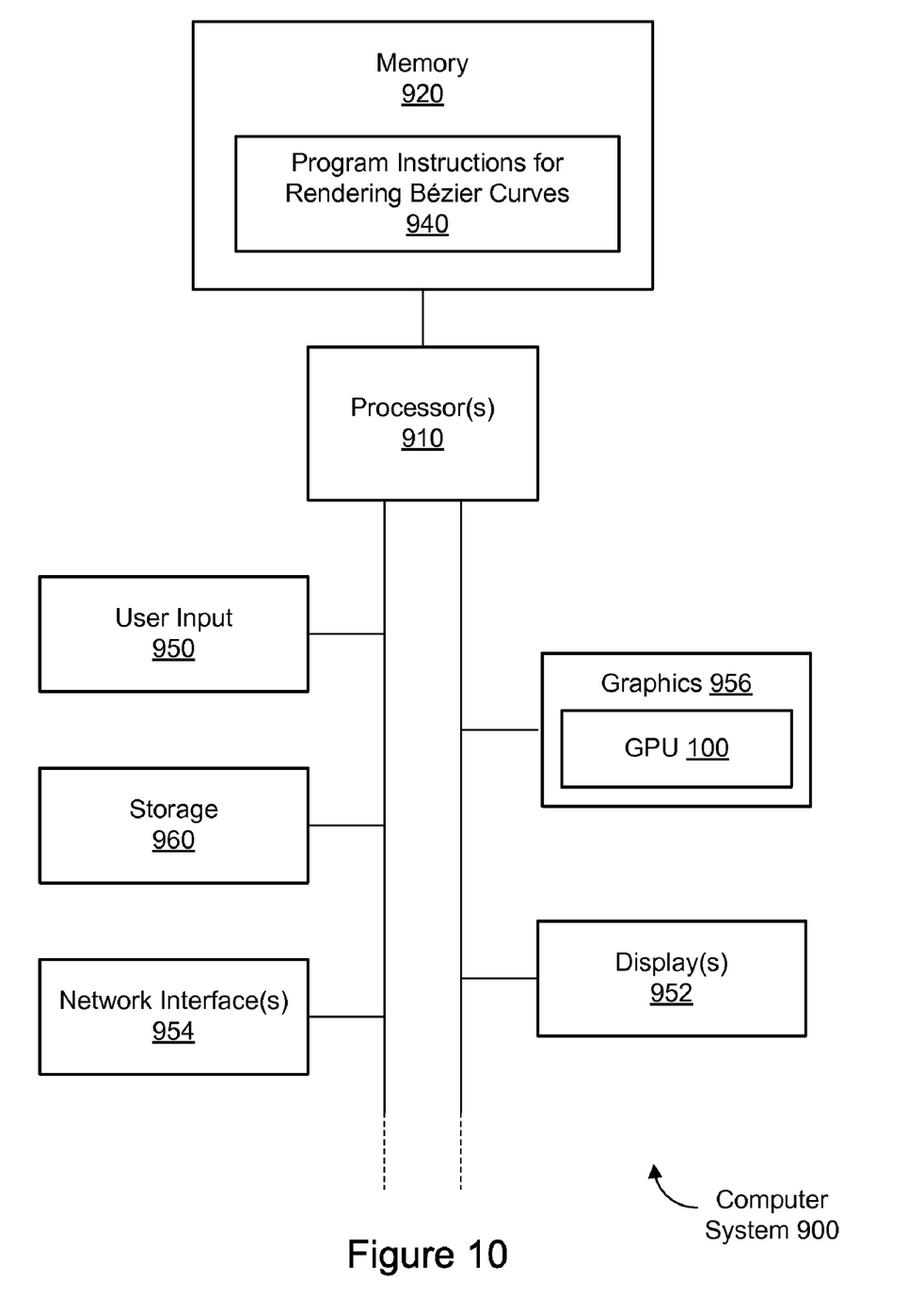
FIG. 10 is a block diagram illustrating constituent elements of a computer system that is configured to implement embodiments of the system and method for rendering Bézier curves.

FIG. 9 is a flow diagram illustrating a method for rendering quadratic Bézier curves on a GPU 100 using barycentric coordinates according to one embodiment. As shown in block 810, a respective set of barycentric coordinates may be assigned to each of three vertices of a triangle. The triangle may comprise a control triangle for a quadratic Bézier curve, where the control triangle is defined by the three control points (i.e., a first endpoint, a second endpoint, and an additional "off curve" control point) of the quadratic Bézier curve. The quadratic Bézier curve may be a rational quadratic Bézier curve.

Each set of barycentric coordinates comprises three standard values. For example, a first set of barycentric coordinates (1,0,0) may be assigned to a first vertex, a second set of barycentric coordinates (0,1,0) may be assigned to a second vertex, and a third set of barycentric coordinates (0,0,1) may be assigned to a third vertex. In one embodiment, the control point $b_1$ is matched to the barycentric coordinate $\tau_1 = (0,1,0)$ so that the set of coordinates (0,1,0) are assigned to the vertex corresponding to the non-endpoint control point of the curve.

Each set of barycentric coordinates may be sent to the GPU as one or more texture parameters associated with the corresponding vertex of the triangle. Because the sum of the barycentric coordinates in any given set of coordinates is 1, only two of the three values in each set of barycentric coordinates may be sent to the GPU for each vertex; the third value may be determined from the other two values, e.g., as $\tau_2 = 1 - (\tau_0 + \tau_1)$. Because the $\tau$ values are pre-defined triples, the triples at each vertex may be represented by an index into a global array storing the actual vertex parameters. The index may comprise an integer representing the vertex type. Therefore, only one parameter per vertex need be sent to the GPU in one embodiment. In the GPU, a set of barycentric coordinates may be determined for each of a plurality of points on edges of the triangle and within the triangle by interpolating between the sets of barycentric coordinates assigned to the three vertices of the triangle. In this manner, the GPU may interpret the barycentric coordinates and pass them as input to the pixel shader.

As shown in block 820, the quadratic Bézier curve represented by the barycentric coordinates may be rendered using a graphics processing unit (GPU). The rendering may comprise evaluating a function of the barycentric coordinates. The function may be evaluated in the pixel shader of the GPU. For example, Equation 7 ($\tau_1^2 = 4 w_1^2 \tau_0 \tau_2$) may be evaluated for each point in the triangle to determine whether the point lies above or below the quadratic Bézier curve, and the point may be clipped or painted accordingly. If points above the curve are to be painted, then points for which $\tau_1^2 < 4 w_1^2 \tau_0 \tau_2$ may be clipped. If points below the curve are to be painted, then points for which $\tau_1^2 > 4 w_1^2 \tau_0 \tau_2$ may be clipped instead.

The method shown in FIG. 9 may be applied to normal Bézier quadratic curves and the more general case of rational Bézier quadratic curves and non-parabolic conic curves. If the $w_1$ value is set to 1, the $w_1$ value need not be sent to the GPU; instead, the value 1 may be substituted for $w_1$ in evaluating Equation 7 in the GPU. In one embodiment, the type of Bézier curve may be changed by changing the value of $w_1$. If the value of $w_1$ varies for each curve, then the value of $w_1$ may be sent to the GPU. In the case of a rational quadratic, the $w_1$ parameter may be sent to the GPU along with the barycentric coordinates. If the $w_1$ parameter is constant, it may be stored on the GPU as a uniform or global variable and directly substituted into Equation 7. The use of a wider range of quadratics may provide increased flexibility in fitting shapes. For example, while it may take four cubic Bézier curves to fit a circle, the circle may be exactly fitted with only three rational quadratic Bézier curves. Reducing the number of curves (and corresponding triangles) sent to the GPU may conserve bandwidth between the host and the GPU as well as the computational resources of the GPU.

FIG. 10 is a block diagram illustrating constituent elements of a computer system 900 that is configured to implement embodiments of the system and method for rendering Bézier curves. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 1. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the curve-rendering techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor (s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 10, as illustrated by the ellipsis shown.

In various embodiments, the elements shown in FIGS. 2, 4-7, and 9 may be performed in a different order than the illustrated order. In FIGS. 2, 4-7, and 9, any of the operations described in the elements may be performed programmatically (i.e., by a computer according to a computer program). In FIGS. 2, 4-7, and 9, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    assigning a respective set of barycentric coordinates to each of three vertices of a triangle, wherein the triangle comprises a control triangle for a quadratic Bézier curve, and wherein each set of barycentric coordinates comprises three values; and
    rendering the quadratic Bézier curve using a graphics processing unit (GPU), wherein the rendering comprises evaluating a function of the barycentric coordinates.

2. The method as recited in claim 1, wherein the quadratic Bézier curve is a rational quadratic Bézier curve.

3. The method as recited in claim 1, further comprising:
    sending to the GPU only two of the three values in the set of barycentric coordinates for each corresponding vertex of the triangle.

4. The method as recited in claim 1, further comprising:
    determining a set of barycentric coordinates for each of a plurality of points on edges of the triangle and within the triangle, wherein the determining comprises interpolating between the sets of barycentric coordinates assigned to the three vertices of the triangle.

5. The method as recited in claim 1, wherein rendering the quadratic Bézier curve using the GPU comprises evaluating the function of the barycentric coordinates to determine whether each point in the triangle lies above or below the quadratic Bézier curve.

6. The method as recited in claim 1, wherein the function of the barycentric coordinates is evaluated in a pixel shader.

7. The method as recited in claim 1, wherein assigning the set of barycentric coordinates to each of the three vertices of the triangle comprises:
    assigning a first set of barycentric coordinates (1,0,0) to a first vertex of the three vertices;
    assigning a second set of barycentric coordinates (0,1,0) to a second vertex of the three vertices; and
    assigning a third set of barycentric coordinates (0,0,1) to a third vertex of the three vertices.

8. The method as recited in claim 1, further comprising:
    determining an integer representing each set of barycentric coordinates as a type of the corresponding vertex, wherein the integer comprises an index into a global array which stores a plurality of vertex parameters;
    sending the integer representing each set of barycentric coordinates to the GPU as a texture parameter associated with the corresponding vertex of the triangle.

9. A computer-readable storage medium, comprising program instructions, wherein the program instructions are computer-executable to implement:

assigning a respective set of barycentric coordinates to each of three vertices of a triangle, wherein the triangle comprises a control triangle for a quadratic Bézier curve, and wherein each set of barycentric coordinates comprises three values; and rendering the quadratic Bézier curve using a graphics processing unit (GPU), wherein the rendering comprises evaluating a function of the barycentric coordinates.

10. The computer-readable storage medium as recited in claim 9, wherein the quadratic Bézier curve is a rational quadratic Bézier curve.

11. The computer-readable storage medium as recited in claim 9, wherein the program instructions are computer-executable to implement:

sending to the GPU only two of the three values in the set of barycentric coordinates for each corresponding vertex of the triangle.

12. The computer-readable storage medium as recited in claim 9, wherein the program instructions are computer-executable to implement:

determining a set of barycentric coordinates for each of a plurality of points on edges of the triangle and within the triangle, wherein the determining comprises interpolating between the sets of barycentric coordinates assigned to the three vertices of the triangle.

13. The computer-readable storage medium as recited in claim 9, wherein rendering the quadratic Bézier curve using the GPU comprises evaluating the function of the barycentric coordinates to determine whether each point in the triangle lies above or below the quadratic Bézier curve.

14. The computer-readable storage medium as recited in claim 9, wherein the function of the barycentric coordinates is evaluated in a pixel shader.

15. The computer-readable storage medium as recited in claim 9, wherein assigning the set of barycentric coordinates to each of the three vertices of the triangle comprises:

assigning a first set of barycentric coordinates (1,0,0) to a first vertex of the three vertices;

assigning a second set of barycentric coordinates (0,1,0) to a second vertex of the three vertices; and assigning a third set of barycentric coordinates (0,0,1) to a third vertex of the three vertices.

16. The computer-readable storage medium as recited in claim 9, wherein the program instructions are computer-executable to implement:

determining an integer representing each set of barycentric coordinates as a type of the corresponding vertex, wherein the integer comprises an index into a global array which stores a plurality of vertex parameters;

sending the integer representing each set of barycentric coordinates to the GPU as a texture parameter associated with the corresponding vertex of the triangle.

17. A system, comprising:
at least one processor;
a memory coupled to the at least one processor, wherein the memory is configured to store program instructions executable by the at least one processor to assign a respective set of barycentric coordinates to each of three vertices of a triangle, wherein the triangle comprises a control triangle for a quadratic Bézier curve, and wherein each set of barycentric coordinates comprises three values; and a graphics processing unit (GPU) coupled to the at least one processor, wherein the GPU is executable to render the quadratic Bézier curve, wherein the rendering comprises evaluating a function of the barycentric coordinates.

18. The system as recited in claim 17, wherein the quadratic Bézier curve is a rational quadratic Bézier curve.

19. The system as recited in claim 17, wherein the program instructions are further executable by the at least one processor to:

send to the GPU only two of the three values in the set of barycentric coordinates for each corresponding vertex of the triangle.

20. The system as recited in claim 17, wherein the GPU is further executable to:

determine a set of barycentric coordinates for each of a plurality of points on edges of the triangle and within the triangle, wherein the determining comprises interpolating between the sets of barycentric coordinates assigned to the three vertices of the triangle.

21. The system as recited in claim 17, wherein, in rendering the quadratic Bézier curve, the GPU is executable to evaluate the function of the barycentric coordinates to determine whether each point in the triangle lies above or below the quadratic Bézier curve.

22. The system as recited in claim 17, wherein the function of the barycentric coordinates is evaluated in a pixel shader.

23. The system as recited in claim 17, wherein, in assigning the set of barycentric coordinates to each of the three vertices of the triangle, the program instructions are executable by the at least one processor to:

assign a first set of barycentric coordinates (1,0,0) to a first vertex of the three vertices;

assign a second set of barycentric coordinates (0,1,0) to a second vertex of the three vertices; and assign a third set of barycentric coordinates (0,0,1) to a third vertex of the three vertices.

24. The system as recited in claim 17, wherein the program instructions are further executable by the at least one processor to:

determine an integer representing each set of barycentric coordinates as a type of the corresponding vertex, wherein the integer comprises an index into a global array which stores a plurality of vertex parameters;

send the integer representing each set of barycentric coordinates to the GPU as a texture parameter associated with the corresponding vertex of the triangle.

* * * * *